US007853646B2

(12) United States Patent
Black et al.

(10) Patent No.: US 7,853,646 B2
(45) Date of Patent: Dec. 14, 2010

(54) ASSURED VALIDATION FOR FACADE METHOD INVOCATIONS

(75) Inventors: Amanda S. Black, Austin, TX (US); Steven Lee Martin, Houston, TX (US); Christopher Ian Schmidt, Friendswood, TX (US); Michael Lindsey Williams, Rockwall, TX (US)

(73) Assignee: International Business Machines Corporation, Armonk, NY (US)

( * ) Notice: Subject to any disclaimer, the term of this patent is extended or adjusted under 35 U.S.C. 154(b) by 1358 days.

(21) Appl. No.: 11/340,276

(22) Filed: Jan. 26, 2006

(65) Prior Publication Data

US 2007/0192405 A1 Aug. 16, 2007

(51) Int. Cl.
G06F 15/16 (2006.01)

(52) U.S. Cl. .................. 709/203; 709/225; 709/227; 709/229

(58) Field of Classification Search .................. 709/200, 709/203, 217–219, 223–225, 227–229
See application file for complete search history.

(56) References Cited

U.S. PATENT DOCUMENTS

| 6,289,382 | B1 * | 9/2001 | Bowman-Amuah | ......... 709/226 |
| 6,332,163 | B1 * | 12/2001 | Bowman-Amuah | ......... 709/231 |
| 6,654,932 | B1 | 11/2003 | Bahrs et al. | |
| 6,915,454 | B1 * | 7/2005 | Moore et al. | ................. 714/38 |
| 7,054,890 | B2 * | 5/2006 | Musante et al. | ............. 707/201 |
| 2004/0194057 | A1 | 9/2004 | Schulte et al. | |

OTHER PUBLICATIONS

Reimer, et al.; Validating Structural Properties of Nested Objects; OOPSLA '04, Oct. 24-28, 2004, Vancouver, British Columbia, Canada; ACM 1-58113-833-4/04/0010; pp. 294-304.
Christensen, et al.; Extending Java for High-Level Web Service Construction; ACM Transactions on Programming Languages and Systems, vol. 25, No. 6, Nov. 2003; pp. 814-875.
Raghavan, G.; Introducing object validation and navigation in software process to improve software quality; Product Focused Software Process Improvement; 4th International Conference, PROFES 2002. Proceedings (Lecture Notes in Computer Science vol. 2559), pp. 94-102, Published: Berlin, Germany, 2002, xv+646 pp. AN-7679196.
OOPSLA 2004. 19th Annual Conference on Object-Oriented Programming, Systems, Languages, and Applications; SIGPLAN Notices, vol. 39, No. 10, Oct. 2004. ISSN 0362-1340; AN-8444405.

* cited by examiner

*Primary Examiner*—Faruk Hamza
(74) *Attorney, Agent, or Firm*—Schmeiser, Olsen & Watts; John R. Pivnichny

(57) ABSTRACT

A method and system for validating calling parameters of a method call. Validation conditions are evaluated utilizing original calling parameters provided by a validation method call by a client, where the call is required to initiate an activity. The evaluating facilitates determining messages to be provided to a user, where the messages are associated with consequences of continuing the activity. A validation object having data structures is created. The data structures include the validation conditions and the original calling parameters. The validation object is sent to the client to facilitate receipt of the messages by the user. The calling parameters are extracted from the validation object to facilitate completing the activity with a set of calling parameters matching the original calling parameters.

19 Claims, 3 Drawing Sheets

ASSURED VALIDATION FOR FACADE METHOD INVOCATIONS

BACKGROUND OF THE INVENTION

1. Technical Field

The present invention relates to an assured validation technique for façade method invocations.

2. Related Art

Conventional techniques that require a caller to utilize a validation method to perform an activity must employ a stateful system or process rather than a stateless approach. Using a stateful approach has disadvantages related to its memory constraints, system maintainability, limitations in scalability, and its required amount of computation. Further, conventional validation processes are limited to employing exception handling that breaks the flow of execution without allowing the end user the option of continuing the execution. Thus, there exists a need for a technique that overcomes the deficiencies and limitations described above.

SUMMARY OF THE INVENTION

In first embodiments, the present invention provides a method of validating one or more calling parameters of a method call in a computing environment, the method comprising:

evaluating one or more validation conditions, the evaluating comprising utilizing one or more calling parameters provided by a validation method call by a client computing system, the call initiating an activity, the evaluating facilitating a determination of one or more messages to be provided to a user, the one or more messages associated with consequences of continuing the activity;

creating a validation object having data structures that include the one or more validation conditions and the one or more calling parameters, the validation object to be sent to the client computing system to facilitate receipt of the one or more messages by the user;

extracting the one or more calling parameters from the validation object to facilitate a completion of the activity with a set of one or more calling parameters that match the one or more calling parameters.

In second embodiments, the present invention provides a system for validating one or more calling parameters of a method call in a computing environment, the system comprising:

means for evaluating one or more validation conditions, the evaluating comprising utilizing one or more calling parameters provided by a validation method call by a client computing system, the call initiating an activity, the evaluating facilitating a determination of one or more messages to be provided to a user, the one or more messages associated with consequences of continuing the activity;

means for creating a validation object having data structures that include the one or more validation conditions and the one or more calling parameters, the validation object to be sent to the client computing system to facilitate receipt of the one or more messages by the user;

means for extracting the one or more calling parameters from the validation object to facilitate a completion of the activity with a set of one or more calling parameters that match the one or more calling parameters.

In third embodiments, the present invention provides a computer program product comprising a computer-usable medium including computer-usable program code for validating one or more calling parameters of a method call in a computing environment, the computer program product including:

computer-usable code for evaluating one or more validation conditions, the evaluating comprising utilizing one or more calling parameters provided by a validation method call by a client computing system, the call initiating an activity, the evaluating facilitating a determination of one or more messages to be provided to a user, the one or more messages associated with consequences of continuing the activity;

computer-usable code for creating a validation object having data structures that include the one or more validation conditions and the one or more calling parameters, the validation object to be sent to the client computing system to facilitate receipt of the one or more messages by the user;

computer-usable code for extracting the one or more calling parameters from the validation object to facilitate a completion of the activity with a set of one or more calling parameters that match the one or more calling parameters.

In fourth embodiments, the present invention provides a method for deploying computing infrastructure, comprising integrating computer-readable code into a computing system, wherein the code in combination with the computing system is capable of performing a process of validating one or more calling parameters of a method call in a computing environment, the process comprising:

evaluating one or more validation conditions, the evaluating comprising utilizing one or more calling parameters provided by a validation method call by a client computing system, the call initiating an activity, the evaluating facilitating a determination of one or more messages to be provided to a user, the one or more messages associated with consequences of continuing the activity;

creating a validation object having data structures that include the one or more validation conditions and the one or more calling parameters, the validation object to be sent to the client computing system to facilitate receipt of the one or more messages by the user;

extracting the one or more calling parameters from the validation object to facilitate a completion of the activity with a set of one or more calling parameters that match the one or more calling parameters.

Advantageously, the present invention allows a program using a stateless approach to break out of the flow of execution and reinsert itself back at the point of the break. Further, the present invention ensures that at a middleware level, no action that requires a validation can be invoked without first calling a validation method. Still further, the technique described herein supports the evaluation of multiple conditions per validation call. Moreover, the integrity of the original calling parameters is ensured, as an invocation of an activity performs against the same data set as a call to the validation method.

DETAILED DESCRIPTION OF THE INVENTION

The present invention provides an assured validation technique in which a validation object is created in a middleware layer of a computing system. The validation object includes data structures to support a list of validation conditions and calling parameters. The validation object's construction visibility is limited so that it cannot be constructed outside of the defined constraints of the middleware layer. Further, the present invention sets up a pattern of method calls within a façade, including a validation method call and an invocation of an activity, where the validation method returns the validation object, and the validation object is a required parameter of the activity invocation.

Figure 1:
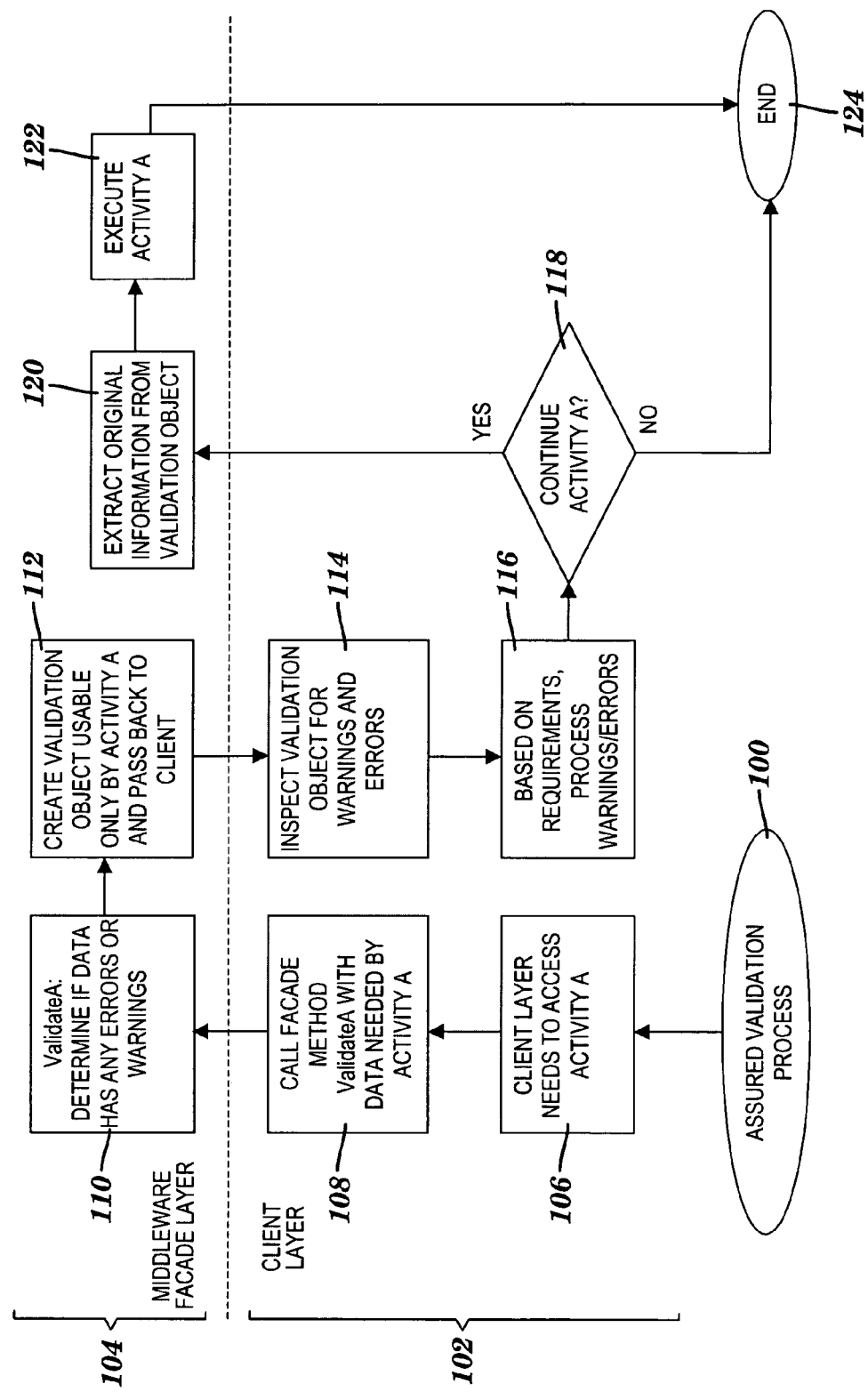
FIG. 1 is a flow chart of an assured validation process, in accordance with embodiments of the present invention.

FIG. 1 is a flow chart of an assured validation process, in accordance with embodiments of the present invention. The assured validation process begins at step 100. As shown in FIG. 1, certain steps in the assured validation process are performed in a client layer 102, and other steps are performed in a stateless middleware façade layer 104. As used herein, middleware is defined as software that functions as a conversion or translation layer connecting two separate applications or two logical partitions of the same application, thereby allowing data to be passed between the applications or between the logical partitions, respectively. In one embodiment, middleware layer 104 is an abstraction of an underlying logical partition of an application. As used herein, a façade is defined as a set of code that provides a well-defined interface to a larger body of code, such as a class library.

The present invention can be implemented in, for example, a client-server computing environment. In the case of a client-server environment, middleware façade layer 104 is the server.

In step 106, a user utilizing a client computing unit of client layer 102 wants to perform an activity A through a façade method call to middleware layer 104. Requirements of middleware layer 104 dictate that prior to allowing a call to activity A, a validation method must be called to validate data needed by activity A. As used herein, the "A" in activity A refers to any activity accessible from the middleware layer. An example of activity A is the deletion of an object that is being stored in middleware layer 104 (e.g., deletion of information related to a person, where the information is stored in a database).

In step 108, the required validation is initiated by client layer 102 calling a façade method with the data that is needed by activity A. Hereinafter, the façade method called in step 108 is referred to as ValidateA. The data provided to ValidateA is also referred to as the original calling parameters. In the above-described example of deleting information related to a person, the data needed to delete the person's information is an identifier that uniquely identifies the person whose information is being deleted. Hereinafter, this example of deleting a person's information from a database is referred to simply as the "deletion example" or as "deleting the person."

In one embodiment, multiple activities can be accessed by client layer 102. In this embodiment, each activity has a particular validation method associated with it. For instance, if client layer 102 can access activities A, B and C, then middleware layer 104 provides three separate validation methods ValidateA, ValidateB and ValidateC.

In step 110, the ValidateA façade method of middleware layer 104 determines if performing activity A with the data provided in step 108 would cause one or more errors and/or one or more warnings based on a set of pre-defined validation conditions. In the deletion example, step 110 determines if deleting the person would cause any error or warning messages to be sent to the user who is initiating activity A in the process of FIG. 1. In this example, each person of a set of persons is associated with one or more documents, and the deletion of a person of the set of persons results in the deletion of the associated document(s). In this case, an example of a warning is a notification to the user that the associated document(s) will be destroyed if the person is deleted, combined with a request to the user to confirm that the deletion of the person is to be completed. Further, in this case, an example of an error is that the data in step 108 passed to ValidateA is incorrect as it does not match any person in the set of persons, and the process cannot move forward.

In step 112, the façade method ValidateA returns a validation object (a.k.a. token) usable only by activity A. The validation object is automatically created by middleware layer 104 and is passed back to client layer 102 (i.e., the validation object is returned to the caller). The validation object includes data structures that include a list of validation condition results and the original calling parameters of step 108. The validation condition results include the one or more errors and/or warnings, which were determined in step 110 based on the pre-defined validation conditions. These validation condition results allow the client layer 102 to present one or more messages to the user about the consequences of continuing with activity A, and allow the user the option of overriding the messages to continue the processing of activity A. Further, the original calling parameters in the validation object ensures that the method calls to ValidateA and to activity A are performed against the same data set. Moreover, as middleware layer 104 is stateless, it does not track what is calling the middleware layer and what activity was performed. Thus, a token (i.e., the validation object) is provided to allow middleware layer 104 to know that activity A was called and that the caller is validated.

Extending the deletion example, if there is another activity B with an associated validation method ValidateB, then a client calling ValidateB would receive a token associated with activity B. If an attempt was made to send the token related to activity B to a method other than ValidateB (e.g., ValidateA for deleting the person), then the call would be invalid because the middleware has knowledge that the token has not been associated with the delete functionality.

Further, the construction visibility of the validation object created in step 112 is limited so that it cannot be instantiated external to middleware 104. More particularly, the validation object cannot be instantiated by client layer 102. This limitation of construction visibility prevents the client from creating or re-creating the validation object to maliciously skip validation steps of the process of FIG. 1.

In step 114, client layer 102 utilizes one or more methods included in the validation object to determine if the one or more warnings and/or errors determined in step 110 are included in the validation object. In step 116, client layer 102 processes the one or more warnings and/or errors found in step 114, based on one or more predefined requirements. The processing of the one or more warnings and/or errors includes sending the warnings/errors to the user and requesting the user to confirm whether processing should continue. A pre-defined requirement on which step 116 is based is an action to be performed by the client upon receipt by the client of a particular warning or error associated with the action. For example, one action to be performed by the client may be to process an item in the validation object that indicates a warning so that a message with predefined wording is presented to the end user. In the deletion example, step 116 displays an onscreen message to the user that states that the person being deleted has associated documents that will be deleted if the person is deleted, and also requests that the user confirm that the deletion should be completed.

In step 118, the user decides whether or not to continue with activity A based on the one or more warnings and/or errors received. In one embodiment, step 110 evaluates multiple pre-defined validation conditions independently for a single validation call, and then returns the results of the evaluation (i.e., whether any of the conditions fail) to the client for inspection and processing in steps 114 and 116. In this way, the user is allowed to view multiple warnings for a single validation call before deciding, in step 118, whether or not to override any or all of the failed conditions and continue the flow of execution.

Extending the deletion example, in addition to the user receiving the above-described warning (a.k.a. the first warning) regarding associated documents to be deleted, the user also receives a second warning that states that any changes made to the person's profile information will also be deleted if the person is deleted. In this extended example, the user decides not to continue with the deletion activity because the first warning is known, and the user knows that the associated documents to be deleted may pertain to other persons besides the person being deleted. In contrast, had the user known about the second warning only, he or she may have decided to continue with the deletion of the person, not realizing that information related to other persons would be deleted via the deletion of the associated documents.

If the user decides not to continue activity A in step 118, then the assured validation process ends at step 124. If the user decides to continue activity A, then the validation object is passed back to middleware layer 104, and step 120 extracts the original information (i.e., the original calling parameters from step 108) from the validation object. The original information extracted in step 120 is inspected to ensure that activity A will be executed with the same calling parameters as those supplied in the ValidateA call in step 108. That is, the integrity of the original calling parameters is ensured for the execution of activity A (see step 122). For example, the original information, such as a person's ID (e.g., social security number), is sent by client layer 102 to middleware layer 104 in step 108. Throughout the process of FIG. 1, the person's ID is tracked, to facilitate ensuring that the person's information is not changed maliciously. In the process of FIG. 1, client layer 102 cannot modify the original information that was passed to the ValidateA method.

The original information first passed in step 108 and extracted in step 120 is used in step 122 to actually execute activity A. That is, the validation object created by ValidateA is a required parameter for the call of activity A. After activity A is executed, the process of FIG. 1 ends at step 124.

In the deletion example, a user views a warning in step 116 and decides in step 118 to continue with the deletion regardless of the associated documents that will be deleted (i.e., the warning is overridden by the user). The person's ID extracted in step 120 is used to actually delete the person in step 122.

Example of Constructing a Validation Object

Figure 2:
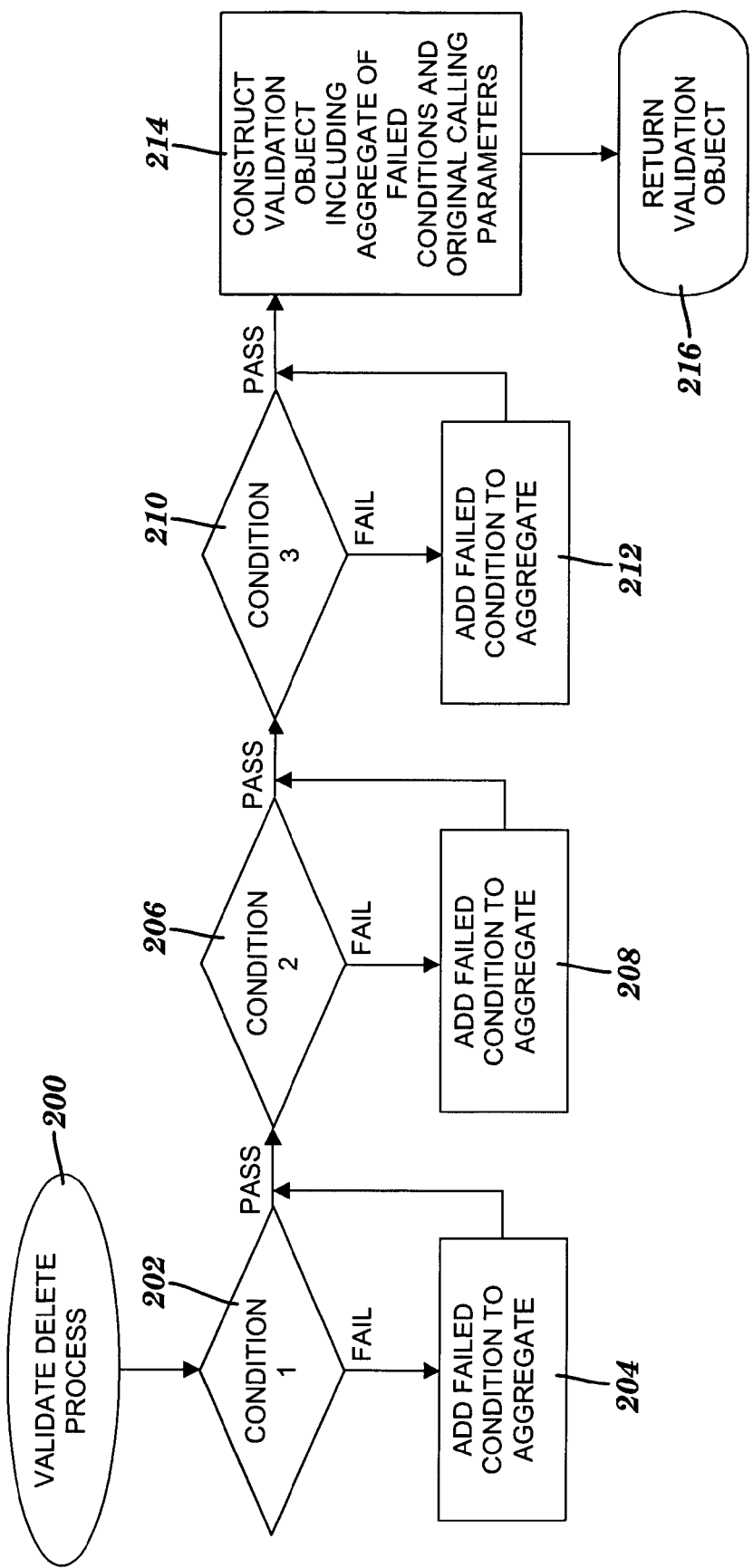
FIG. 2 is a flow chart of a validation method used in the process of FIG. 1, in accordance with embodiments of the present invention.

FIG. 2 is a flow chart of a validation method used in the process of FIG. 1, in accordance with embodiments of the present invention. In this example, activity A of the process of FIG. 1 is a Delete activity, in which an item is deleted from a database. The validation condition warns the end user that associations will be lost if the item to be deleted has associations to other items, and the associations will be lost upon the completion of the Delete activity. Further, the validation condition warns that the item being deleted is the last item in the system, and therefore the system will be inaccessible after such a deletion. Methods used in this example include the following:

ValidationObject ValidateDelete(param1, param2, param3);

Delete(ValidationObject);

The validation method starts at step 200 with three predefined conditions to be evaluated. The first condition is evaluated in step 202. If the first condition fails, the failed first condition is added to an aggregate of failed conditions in step 204. After step 204, or if the first condition passes (i.e., is not a failed condition) in step 202, the second condition is evaluated in step 206. If the second condition fails, the failed second condition is added to the aggregate of failed conditions in step 208. After step 208, or if the second condition passes in step 206, the third condition is evaluated in step 210. If the third condition fails in step 210, the failed third condition is added to the aggregate of failed conditions in step 212. After step 212, or if the third condition passes in step 210, the validation object is constructed in step 214 so that it includes the aggregate of failed conditions and the original calling parameters (i.e., param1, param2 and param3). After constructing the validation object, the validation object is returned and passed to client layer 102 (see FIG. 1). After step 216, warnings and errors are presented to the user (see step 116 of FIG. 1). If the user decides to continue with the processing of the Delete activity (see step 118 of FIG. 1), the original calling parameters are extracted from the validation object (see step 120 of FIG. 1) and the Delete activity is executed (see step 122 of FIG. 1).

Computing System

Figure 3:
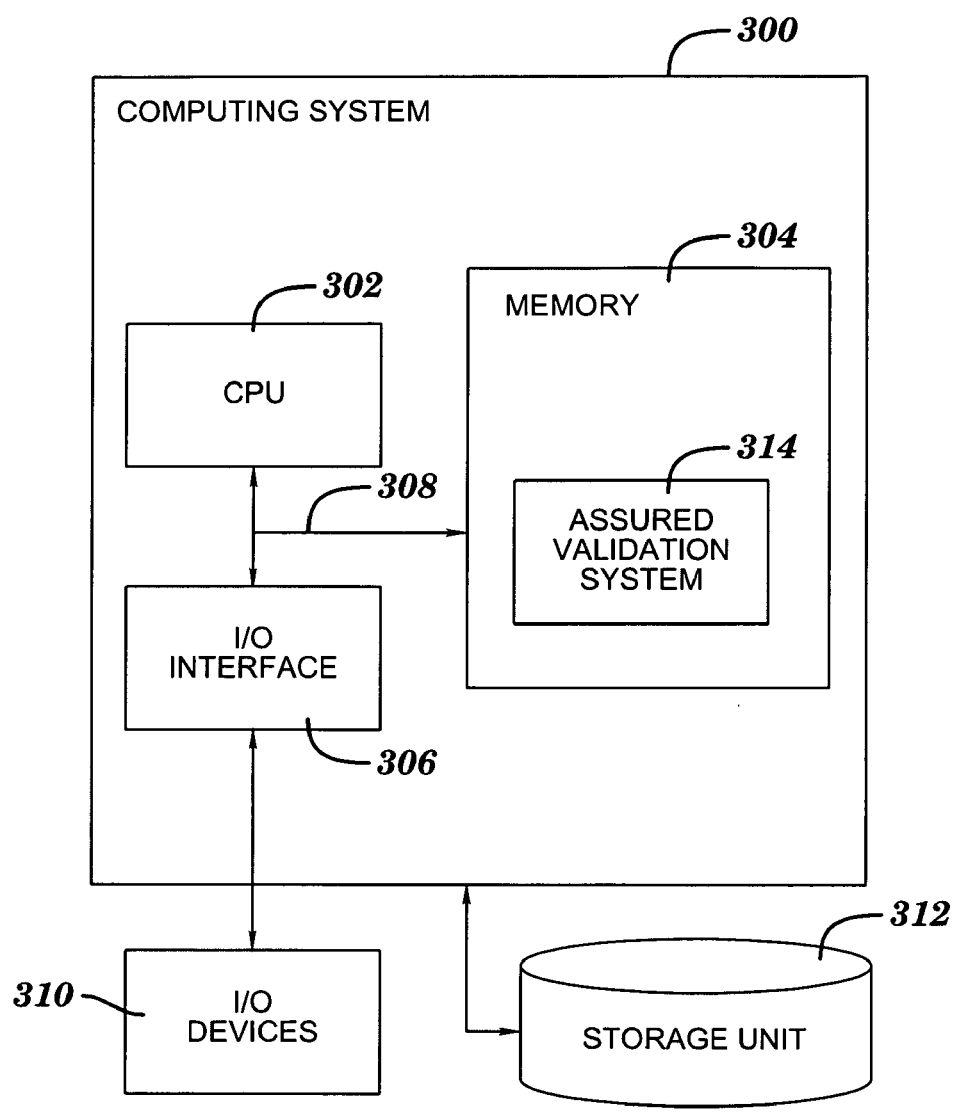
FIG. 3 is a block diagram of a computing system implementing the process of FIG. 1, in accordance with embodiments of the present invention.

FIG. 3 is a block diagram of a computing system implementing the process of FIG. 1, in accordance with embodiments of the present invention. Computing system 300 generally comprises a central processing unit (CPU) 302, a memory 304, an input/output (I/O) interface 306, a bus 308, I/O devices 310 and a storage unit 312. CPU 302 performs computation and control functions of computing system 300. CPU 302 may comprise a single processing unit, or be distributed across one or more processing units in one or more locations (e.g., on a client and server). Memory 304 may comprise any known type of data storage and/or transmission media, including magnetic media, optical media, random access memory (RAM), read-only memory (ROM), a data cache, a data object, etc. Storage unit 312 is, for example, a magnetic disk drive or an optical disk drive. Moreover, similar to CPU 302, memory 304 may reside at a single physical location, comprising one or more types of data storage, or be distributed across a plurality of physical systems in various forms. Further, memory 304 can include data distributed across, for example, a LAN, WAN or storage area network (SAN) (not shown).

I/O interface 306 comprises any system for exchanging information to or from an external source. I/O devices 310 comprise any known type of external device, including a display monitor, keyboard, mouse, printer, speakers, handheld device, printer, facsimile, etc. Bus 308 provides a communication link between each of the components in computing system 300, and may comprise any type of transmission link, including electrical, optical, wireless, etc.

I/O interface 306 also allows computing system 300 to store and retrieve information (e.g., program instructions or data) from an auxiliary storage device, such as a non-volatile storage device (e.g., a CD-ROM drive which receives a CD-ROM disk) (not shown). Computing system 300 can store and retrieve information from other auxiliary storage devices (not shown), which can include a direct access storage device (DASD) (e.g., hard disk or floppy diskette), a magneto-optical disk drive, a tape drive, or a wireless communication device.

Memory 304 includes computer program code comprising an assured validation system 314 including program code that implements the process of FIG. 1. Further, memory 304 may include other systems not shown in FIG. 3, such as an operating system (e.g., Linux) that runs on CPU 302 and provides control of various components within and/or connected to computing system 300.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code 314 for use by or in connection with a computing system 300 or any instruction execution system to provide and facilitate the capabilities of the present invention. For the purposes of this description, a computer-usable or computer-readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, RAM, ROM, a rigid magnetic disk and an optical disk. Current examples of optical disks include compact disk—read-only memory (CD-ROM), compact disk—read/write (CD-R/W) and DVD.

A computing system 300 suitable for storing and/or executing program code 314 includes at least one processor 302 coupled directly or indirectly to memory elements 304 through a system bus 308. The memory elements can include local memory employed during actual execution of the program code, bulk storage, and cache memories which provide temporary storage of at least some program code in order to reduce the number of times code must be retrieved from bulk storage during execution.

Furthermore, the present invention discloses a method for deploying or integrating computing infrastructure, comprising integrating computer-readable code into computer system 300, wherein the code in combination with computer system 300 is capable of providing the assured validation technique described herein. The disclosed method for deploying or integrating computing infrastructure with the capabilities described herein can be offered as a service on a subscription service.

The sequence diagrams or flow diagrams depicted herein are provided by way of example. There may be variations to these diagrams or the steps (or operations) described herein without departing from the spirit of the invention. For instance, in certain cases, the steps may be performed in differing order, or steps may be added, deleted or modified. All of these variations are considered a part of the present invention as recited in the appended claims.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

Code Example

The following Java® code example includes primary classes ServerFacade and ClientApplication, and support classes DocumentLossWarning, DataException, and ValidationException, which implement the assured validation process described above relative to FIGS. 1 and 2. The following code example provides for the deletion of a user stored in a system, where the deletion is initiated by an end user.

```java
/*
 * Simple class providing a sample set of functionality
 * that a server application might provide
 */
public class ServerFacade {
    private static final String DELETE_USER_KEY = "DeleteUser";
    /**
     * Simple validation object that contains warnings
     * for a specific action that the server performs.
     */
    public class ValidationObject {
        private List params = null;
        private List validationWarnings = null;
        private String functionKey = null;
        private ValidationObject(String functionKey)
        {
            this.functionKey = functionKey;
        }
        /**
         * @return Returns the params.
         */
        public List getParams( ) {
            return params;
        }
        /**
         * @return Returns the validationWarnings.
         */
        public List getValidationWarnings( ) {
            return validationWarnings;
        }
        /**
         * Add a single warning to the validation object
         * @param warning
         */
        public void addValidationWarning(Object warning)
        {
            if (validationWarnings == null)
            {
                validationWarnings = new ArrayList( );
            }
            validationWarnings.add(warning);
        }
        /**
         * Add a single parameter to the validation object
         * @param param
         */
        public void addParam(Object param)
        {
            if (params == null)
            {
                params = new ArrayList( );
            }
            params.add(param);
        }
        /**
         * @return Returns the functionKey.
         */
        public String getFunctionKey( ) {
            return functionKey;
```

```
        }
    }
/**
 * Validates that a user can be deleted from the system.
 *
 * Possible warnings that can be encountered with this call:
 * DocumentLossWarning - There are documents associated with this
 * user that will be removed from the system if the user is deleted.
 *
 * @param userid - Identifier of the user to delete from the system.
 * @return - A validation object containing any potential warnings
 * with the delete request.
 */
public ValidationObject validateDeleteUser(String userid)
{
    ValidationObject vo = null;
    List params = new ArrayList( );
    // Create a validation object with the parameters from
    this method
    vo = new ValidationObject(DELETE_USER_KEY);
    vo.addParam(userid);
    //   Do business logic to determine if deleting this userid
    //   will cause loss of documents
    // ...
    // If documents will be lost, add the warning
    vo.addValidationWarning(new DocumentLossWarning( ));
    return vo;
}
/**
 * Performs the Delete User use case.
 * Assumes that the end user has accepted any warnings
 * that may have been encountered in the validateDeleteUser
 method call.
 *
 * @param validObject - Original validation object that was created
 * by client when the validateDeleteUser method was called.
 * @throws DataException - Thrown in cases where a critical error is
 * encountered that does not allow the user to be deleted.
 * @throws ValidationException - Thrown if the validation object is
 * detected to be for a different validate method call
 */
public void deleteUser(ValidationObject validObject) throws
DataException, ValidationException
{
    String userid = null;
    List params = null;
    // Ensure that this validation object is for
    // the delete user use case
    if (!DELETE_USER_KEY.equals(validObject.-
    getFunctionKey( )))
    {
        throw new ValidationException("Validation object sent into
method not created for delete use case");
    }
    // Parameters are created in the order they are sent
    // into the validateX method
    params = validObject.getParams( );
    if (params != null)
    {
        userid = (String)params.get(0);
    }
    // Do middleware business logic to delete the user.
    // If a serious error is encountered, throw a DataException,
    // otherwise complete business logic while using the userid
    // retrieved from the validation object
    }
}
...
/**
 * Example client application that makes use of a server facade
 * that provides a user delete method.
 */
public class ClientApplication {
    public static void main(String[ ] args)
    {
        String userid = "cschmid";
        ServerFacade facade = new ServerFacade( );
        List deleteWarnings = null;
        ServerFacade.ValidationObject vo =
        facade.validateDeleteUser(userid);
        deleteWarnings = vo.getValidationWarnings( );
        if (deleteWarnings != null && deleteWarnings.size( ) > 0)
        {
            // Handle the warnings and ensure end user
            // wishes to continue
            // ...
        }
        try {
            // If the end user wishes to continue, delete the user
            facade.deleteUser(vo);
        } catch (DataException e) {
            // Handle data errors
        } catch (ValidationException e) {
            // Handle validation errors
        }
    }
}
...
/**
 * Sample exception that acts as a warning for server calls.
 * This warning signifies that documents stored on the server
 * will be deleted if the current use case is completed.
 */
public class DocumentLossWarning extends Exception {
    public DocumentLossWarning( ) {
        super( );
    }
    /**
     * @param message
     */
    public DocumentLossWarning(String message) {
        super(message);
    }
    /**
     * @param message
     * @param cause
     */
    public DocumentLossWarning(String message, Throwable cause) {
        super(message, cause);
    }
    /**
     * @param cause
     */
    public DocumentLossWarning(Throwable cause) {
        super(cause);
    }
}
...
/**
 * Simple exception
 */
public class DataException extends Exception {
    public DataException( )
    {
        super( );
    }
    public DataException(Exception err)
    {
        super(err);
    }
    public DataException(String errMsg)
    {
        super(errMsg);
    }
}
...
/**
 * Simple exception denoting errors with parsing a validation method
 */
public class ValidationException extends Exception {
    public ValidationException( ) {
        super( );
    }
    /**
     * @param message
     */
    public ValidationException(String message) {
        super(message);
```

-continued

```
    }
    /**
     * @param message
     * @param cause
     */
    public ValidationException(String message, Throwable cause) {
        super(message, cause);
    }
    /**
     * @param cause
     */
    public ValidationException(Throwable cause) {
        super(cause);
    }
}
```

What is claimed is:

1. A method of validating one or more calling parameters of a method call in a computing environment, comprising:
    a server computing system running middleware evaluating one or more validation conditions by utilizing one or more calling parameters provided by a validation method call sent by a client computing system to said server computing system, said validation method call initiating an activity, wherein a result of said evaluating said one or more validation conditions includes facilitating a determination of one or more messages to be provided to a user, said one or more messages associated with consequences of continuing said activity, wherein said middleware is stateless, and wherein said middleware being stateless results in said middleware not tracking said client computing system as having sent said validation method call to said server computing system and said middleware not tracking any action taken by said client computing system;
    said server computing system running said middleware creating a validation object having data structures that include said one or more validation conditions and said one or more calling parameters, said validation object to be sent to said client computing system to facilitate receipt of said one or more messages by said user; and
    a processor of said server computing system running said middleware extracting said one or more calling parameters from said validation object to facilitate a completion of said activity with a set of one or more calling parameters that match said one or more calling parameters.

2. The method of claim 1, further comprising sending said validation object to said client computing system, wherein said sending comprises providing said one or more messages to said user, wherein a result of said providing said one or more messages includes facilitating overriding, by said user, any message of said one or more messages to continue said activity.

3. The method of claim 1, further comprising limiting construction visibility of said validation object to prevent a construction of said validation object by said client computing system.

4. The method of claim 1, further comprising requiring, at a middleware layer of said server computing system, that said validation method is called prior to an invocation of said activity.

5. The method of claim 4, further comprising requiring said validation object to be a parameter of said invocation of said activity.

6. The method of claim 1, wherein said evaluating said one or more validation conditions evaluates multiple validation conditions independently of each other, wherein at least one validation condition of said validation conditions is designated as a failed condition based on said evaluating, and wherein said at least one validation condition is capable of being overridden by said user to continue said activity.

7. The method of claim 1, further comprising providing said validation method call via a façade in a middleware layer of said server a computing system.

8. The method of claim 1, further comprising:
    providing a service for at least one of integrating and deploying computer-readable code in said server computing system comprising a computer-readable memory unit, wherein said code in combination with said server computing system is capable of performing said evaluating said one or more validation conditions, said creating said validation object, and said extracting said one or more calling parameters.

9. A computer system for validating one or more calling parameters of a method call, the computer system comprising:
    a processor;
    a computer readable memory;
    a computer readable storage medium;
    first program instructions to evaluate one or more validation conditions by utilizing one or more calling parameters provided by a validation method call sent by a client computing system to middleware running on said computer system, said validation method call initiating an activity, wherein a result of evaluating said one or more validation conditions by said first program instructions includes facilitating a determination of one or more messages to be provided to a user, said one or more messages associated with consequences of continuing said activity, wherein said middleware is stateless, and wherein said middleware being stateless results in said middleware not tracking said client computing system as having sent said validation method call to said computer system and said middleware not tracking any action taken by said client computing system;
    second program instructions to create a validation object having data structures that include said one or more validation conditions and said one or more calling parameters, said validation object to be sent to said client computing system to facilitate receipt of said one or more messages by said user; and
    third program instructions to extract said one or more calling parameters from said validation object to facilitate a completion of said activity with a set of one or more calling parameters that match said one or more calling parameters,
    wherein said first, second, and third program instructions are stored on said computer readable storage medium and are executable by said processor via said computer readable memory.

10. The computer system of claim 9, further comprising fourth program instructions to send said validation object to said client computing system, wherein sending said validation object by said fourth program instructions includes providing said one or more messages to said user, wherein a result of said providing said one or more messages includes facilitating overriding, by said user, any message of said one or more messages to continue said activity, wherein said fourth program instructions are stored on said computer readable storage medium and are executable by said processor via said computer readable memory.

11. The computer system of claim 9, further comprising fourth program instructions to limit construction visibility of said validation object to prevent a construction of said validation object by said client computing system, wherein said fourth program instructions are stored on said computer readable storage medium and are executable by said processor via said computer readable memory.

12. The computer system of claim 9, further comprising fourth program instructions to require, at a middleware layer of said computer system, that said validation method is called prior to an invocation of said activity, wherein said fourth program instructions are stored on said computer readable storage medium and are executable by said processor via said computer readable memory.

13. The computer system of claim 12, further comprising fifth program instructions to require said validation object to be a parameter of said invocation of said activity, wherein said fifth program instructions are stored on said computer readable storage medium and are executable by said processor via said computer readable memory.

14. The computer system of claim 9, wherein said first program instructions to evaluate said one or more validation conditions evaluates multiple validation conditions independently of each other, wherein at least one validation condition of said validation conditions is designated as a failed condition based on evaluating said multiple validation conditions independently of each other by said first program instructions, and wherein said at least one validation condition is capable of being overridden by said user to continue said activity.

15. The computer system of claim 9, further comprising fourth program instructions to provide said validation method call via a façade in a middleware layer of said computer system.

16. A computer program product comprising a computer readable storage medium having a computer readable program code stored therein, said computer readable program code containing instructions that when carried out by a processor of a computer system implement a method of validating one or more calling parameters of a method call, said method comprising the steps of:
   evaluating one or more validation conditions by utilizing one or more calling parameters provided by a validation method call sent by a client computing system to middleware running on said computer system, said method call initiating an activity, wherein are result of said evaluating said one or more validation conditions includes facilitating a determination of one or more messages to be provided to a user, said one or more messages associated with consequences of continuing said activity, wherein said middleware is stateless, and wherein said middleware being stateless results in said middleware not tracking said client computing system as having sent said validation method call to said computer system and said middleware not tracking any action taken by said client computing system;
   creating a validation object having data structures that include said one or more validation conditions and said one or more calling parameters, said validation object to be sent to said client computing system to facilitate receipt of said one or more messages by said user; and
   extracting said one or more calling parameters from said validation object to facilitate a completion of said activity with a set of one or more calling parameters that match said one or more calling parameters.

17. The program product of claim 16, wherein said method further comprises sending said validation object to said client computing system, wherein said sending comprises providing said one or more messages to said user, and wherein a result of said providing said one or more messages includes facilitating overriding, by said user, any message of said one or more messages to continue said activity.

18. The program product of claim 16, wherein said method further comprises limiting construction visibility of said validation object to prevent a construction of said validation object by said client computing system.

19. A computer-implemented method of validating one or more calling parameters of a method call, said method comprising:
   a computer system receiving from a client computing system a validation method call that includes one or more original calling parameters that include data needed by an activity, wherein said middleware requires said validation method call to precede said activity;
   said computer system running said middleware determining that an initial performance of said activity using said one or more original calling parameters results in a notification based on an evaluation of one or more validation conditions that determines at least one failed validation condition, wherein said notification is an error or a warning;
   responsive to said determining that said initial performance of said activity results in said notification, said computer system running said middleware creating a validation object having data structures that include said one or more original calling parameters and said notification;
   subsequent to said creating said validation object, said computer system running said middleware sending said validation object to said client computing system;
   subsequent to said sending said validation object to said client computing system, presenting to a user of said client computing system one or more messages about consequences of continuing a performance of said activity by overriding said notification that results from said initial performance of said activity, wherein said one or more messages are based on said notification included in said validation object sent to said client computing system;
   subsequent to said presenting said one or more messages to said user, said computer system running said middleware receiving a second validation object from said client computing system, wherein said receiving said second validation object results from a confirmation by said user to continue said performance of said activity by overriding said notification that results from said initial performance of said activity, and wherein said confirmation is based on said user viewing said one or more messages;
   responsive to said receiving said second validation object from said client computing system, a processor of said computer system running said middleware extracting one or more calling parameters from said second validation object; and
   said computer system running said middleware determining that said one or more calling parameters extracted from said second validation object are the same as said one or more original calling parameters, and responsive thereto, said computer system running said middleware continuing and completing said performance of said activity by overriding said notification that results from said initial performance of said activity.

* * * * *